United States Patent
Cuvelier et al.

(10) Patent No.: US 8,613,208 B2
(45) Date of Patent: Dec. 24, 2013

(54) METHOD FOR FORMING AN IMPROVED WELD BETWEEN A PRIMARY PREFORM AND A SILICA BAR

(75) Inventors: Gaetan Cuvelier, Annequin (FR); Laurent Jardy, Verquigneul (FR); Emmanuel Petitfrere, Villeneuve d'Ascq (FR)

(73) Assignee: Draka Comteq, B.V., Amsterdam (NL)

( * ) Notice: Subject to any disclaimer, the term of this patent is extended or adjusted under 35 U.S.C. 154(b) by 1236 days.

(21) Appl. No.: 12/056,701

(22) Filed: Mar. 27, 2008

(65) Prior Publication Data

US 2009/0078006 A1    Mar. 26, 2009

(30) Foreign Application Priority Data

Mar. 27, 2007    (FR) .................................... 07 02222

(51) Int. Cl.
*C03B 23/207*    (2006.01)

(52) U.S. Cl.
USPC .................................. 65/391; 65/407; 65/43

(58) Field of Classification Search
USPC ............................................ 65/407, 391, 43
See application file for complete search history.

(56) References Cited

U.S. PATENT DOCUMENTS

| | | | |
|---|---|---|---|
| 3,907,536 A | | 9/1975 | Achener |
| 4,145,456 A | | 3/1979 | Kuppers et al. |
| 4,407,667 A | | 10/1983 | Le Noane et al. |
| 4,749,396 A | * | 6/1988 | Hicks, Jr. ........................ 65/412 |
| 5,788,734 A | * | 8/1998 | Hoshino et al. ................. 65/385 |
| 6,098,429 A | | 8/2000 | Mazabraud et al. |
| 6,178,779 B1 | | 1/2001 | Drouart et al. |
| 6,305,195 B1 | | 10/2001 | Fleming, Jr. et al. |
| 6,484,540 B1 | * | 11/2002 | Shimada et al. ................. 65/407 |
| 7,045,737 B2 | | 5/2006 | Onishi et al. |
| 7,937,968 B2 | * | 5/2011 | Maul et al. ........................ 65/43 |
| 2003/0019245 A1 | | 1/2003 | Drouart et al. |
| 2003/0024273 A1 | * | 2/2003 | Ishihara ......................... 65/382 |
| 2007/0147748 A1 | | 6/2007 | Kume et al. |
| 2009/0078006 A1 | | 3/2009 | Cuvelier et al. |

FOREIGN PATENT DOCUMENTS

| | | |
|---|---|---|
| DE | 912622 | 5/1954 |
| EP | 1454889 A1 | 9/2004 |
| EP | 1690836 A1 | 8/2006 |
| EP | 1978001 A1 | 10/2008 |
| JP | 57111255 A | 7/1982 |

OTHER PUBLICATIONS

French Search Report and Written Opinion in corresponding French Application Serial No. 0702222, dated Jun. 21, 2007.
European Search Report in corresponding European Application No. 08005072.7-2111, dated May 27, 2008.
European Patent Office Decision to grant a European patent in counterpart European Application No. 08005072 dated Apr. 14, 2011, pp. 1-2.

* cited by examiner

*Primary Examiner* — John Hoffmann
(74) *Attorney, Agent, or Firm* — Additon, Higgins, Pendleton & Ashe, P.A.

(57) ABSTRACT

The invention relates to a method for welding one end of a primary preform and one end of a silica bar having different properties. The method includes the steps of projecting and fusing silica grain under a plasma torch onto an end of the primary preform and an end of the silica bar, and bringing into contact these respective ends to form an excellent weld between the primary preform and the silica bar. The invention provides a cost-effective way to secure a primary preform to a glass-working lathe support while reducing the risk of costly preform breakage.

10 Claims, 1 Drawing Sheet

METHOD FOR FORMING AN IMPROVED WELD BETWEEN A PRIMARY PREFORM AND A SILICA BAR

CROSS-REFERENCE TO PRIORITY APPLICATION

This application claims the benefit of pending French Application No. 07/02222 (filed Mar. 27, 2007, at the French Patent Office), which is hereby incorporated by reference in its entirety.

FIELD OF THE INVENTION

The present invention relates to an improved method for welding together a primary preform and a silica bar that possess different chemical compositions and properties.

BACKGROUND OF THE INVENTION

An optical fiber is formed by drawing an optical preform on a drawing tower. An optical preform generally includes a primary preform, which itself includes a silica tube of pure or doped silica in which doped and/or pure silica layers have been successively deposited. (These layers become the optical fiber's inner cladding and a central optical core.) The primary preform is typically overcladded or sleeved to increase its diameter, thereby forming a final preform that, on a drawing tower, can be drawn into optical fiber. In this context, the term "inner cladding" refers to the optical cladding formed inside the silica tube, and the term "outer cladding" refers to the optical cladding formed on the outside of the silica tube.

The homothetic optical fiber drawing operation includes placing the optical preform vertically in a tower and drawing an optical fiber strand from one end of the optical preform. For this purpose, high heat is applied to an end of the preform until the silica softens. To achieve an optical fiber of a particular diameter, the drawing speed and temperature are continuously controlled during the drawing operation.

An optical fiber conventionally includes an optical core, which functions to transmit and, optionally, to amplify an optical signal, and an optical cladding, which functions to confine the optical signal within the optical core. For this purpose, the refractive index of the optical core ($n_c$) is greater than the refractive index of the optical cladding ($n_g$) (i.e., $n_c > n_g$). As is well known, the propagation of an optical signal in a single mode optical fiber decomposes into a fundamental mode guided in the optical core and into secondary modes (i.e., cladding modes) guided over a certain distance in the optical core-optical cladding assembly.

A silica tube may be made according to chemical vapor deposition (CVD), such as described in U.S. Pat. No. 3,907,536, which is hereby incorporated by reference in its entirety. This kind of deposition is performed by injecting gas mixtures in a glass substrate tube and then ionizing the gas mixtures. As will be known by those having ordinary skill in the art, chemical vapor deposition encompasses modified chemical vapor depositions (MCVD), furnace chemical vapor depositions (FCVD), and plasma-enhanced chemical vapor depositions (PCVD). The PCVD method is described, for example, in U.S. Pat. No. 4,145,456, which is hereby incorporated by reference in its entirety.

After depositing the glass layers corresponding to the optical core and the inner cladding, the silica tube is closed upon itself in a so-called collapsing operation to obtain a primary preform (i.e., a silica rod). This primary preform is then overcladded to increase its diameter, typically using relatively inexpensive natural silica grain.

U.S. Patent Application Publication No. 2003/0019245, which is hereby incorporated by reference in its entirety, discloses a method of purifying silica and depositing the purified silica onto an optical fiber preform. The overcladding may be carried out by plasma deposition in which the natural silica grain is projected on the primary preform and, via a plasma torch, are fused at a temperature of about 2,300° C. The natural silica grain is vitrified on the periphery of the primary preform to form an outer optical cladding. During the overcladding process, the primary preform is caused to rotate around its longitudinal axis and the plasma torch and/or the primary preform move longitudinally with respect to each other. Such rotational and translational movement facilitates uniform silica deposition over the periphery of the primary preform.

To effect preform overcladding, the primary preform must be connected to an overcladding device, such as a glass-working lathe, and rotated around its longitudinal axis. Typically, this connection is carried out by welding the ends of the primary preform to silica bars that are positioned in the overcladding device. The overcladding operation is generally carried out in a closed cabin with a controlled atmosphere so as to provide protection against electromagnetic perturbations and the evolution of ozone emitted by the plasma torch.

For example, Japanese Patent Application No. JP 57111255, which is hereby incorporated by reference in its entirety, discloses welding a colored quartz disc coaxially between two quartz preform rods to form a discriminative layer (or indicator). During subsequent drawing of optical fibers, this colored indicator facilitates the detection of the transition between the respective preform rods.

U.S. Pat. No. 6,178,779, which is hereby incorporated by reference in its entirety, discloses a method of assembling two optical fiber preforms end-to-end by heating the ends of the preforms and pressing the respective heated ends into contact.

German Patent Application No. DE 912622, which is hereby incorporated by reference in its entirety, discloses a method of assembling two glass rods having different melting points by using intermediate pieces of glass.

U.S. Pat. No. 4,407,667, which is hereby incorporated by reference in its entirety, discloses a continuous process of manufacturing optical fibers by inserting preforms one after the other in a drawing tower and welding them end-to-end in a welding station.

U.S. Pat. No. 6,305,195, which is hereby incorporated by reference in its entirety, discloses isothermal-plasma-torch techniques for welding preforms end-to-end.

European Patent Application No. EP 1,690,836 and its counterpart U.S. Patent Application Publication No. 2007/0147748, which is hereby incorporated by reference in its entirety, disclose a method for connecting optical fiber preforms by bringing the respective preform ends close together, then heating and connecting the respective preform ends.

FIG. 1 illustrates a typical installation for overcladding an optical fiber preform. A primary preform 100 is provided with a first end welded to a first silica bar 215, which is attached to a first glass-working lathe support 205 by chucks 225.

In this regard, the first end of the primary preform 100 is welded by hand to the first silica bar 215 using, for example, a $H_2/O_2$ burner (e.g., a blow torch). Such a blow-torch welding operation is time consuming and costly because it is performed by hand (i.e., by an operator). This hand welding should be performed under an exhaust hood for health and safety reasons.

Thereafter, the primary preform 100 is placed on a glass-working lathe, which includes a second silica bar 210 that is affixed by chucks 220 to a second glass-working lathe support 200. The glass-working lathe drives into rotation both (i) the first silica bar 215 and the affixed primary preform 100 and (ii) the second silica bar 210. A mandrel (not shown) facilitates the rotation of the second silica bar 210. As the primary preform 100 rotates around its longitudinal axis, it is welded by hand to the second silica bar 210 using, for example, the aforementioned $H_2/O_2$ burner.

The silica used for the silica bars 210, 215 is typically low-cost, undoped silica that contains impurities (e.g., dust particles or water). On the other hand, the silica of the primary preform 100 may be doped—perhaps highly doped if the preform is intended to produce single-mode optical fibers or chromatic dispersion compensating optical fibers. The difference in doping between the silica of the primary preform 100 and the silica of the silica bars 210, 215 causes notable performance differences between both materials, notably with respect to viscosity and thermal expansion.

Consequently, the welding of the primary preform 100 directly to the supporting silica bars 210, 215 of the glass-working lathe supports 200, 205 is delicate, requiring care and precision to form a sufficiently strong and accurate weld. For instance, the first end of the primary preform 100 must be carefully welded to the first silica bar 215 with a burner (e.g., a blow torch). With slow and gradual heating, it is possible to produce a solid weld. This operation, however, is costly in both time and productivity.

Moreover, hand welding the primary preform 100 to the first silica bar 215 (or to the second silica bar 210) is subject to human error. The use of a hand-held torch can cause sudden heating or cooling of the silica when the burner (e.g., a blow torch) is directed at or removed from the welding area. This sudden heating or cooling, typically the result of poor welding technique or other human error, exacerbates the differences in thermal behavior, (i.e., difference in expansion or shrinkage between the two materials that are welded). This can yield a low-quality weld between, for example, the first end of the primary preform 100 and the first end of the silica bar 215 (i.e., a brittle weld).

In addition, during the welding process both ends of the primary preform 100 and the ends of the respective silica bars 210, 215 are heated and softened. As noted, contaminants that are present in the silica bars 210, 215 may diffuse into the ends of the primary preform 100. This diffusion of contaminants changes the composition of the primary preform 100 (i.e., after welding, the end of the primary preform 100 is no longer of the same composition as before welding). Consequently, a primary-preform outer end that is welded can no longer be used for drawing optical fiber. In other words, using the foregoing process, a part of the primary preform 100 is unavailable for fiber drawing.

Likewise, it is known to weld together optical fiber preforms in which both of the optical preforms to be welded end-to-end are generally of the same nature, (i.e., intended for drawing the same kind of optical fiber). In such methods, each optical preform consists of silica containing substantially the same dopant concentrations.

The aforementioned U.S. Pat. No. 6,178,779, for example, describes a method for end-to-end assembling two optical fiber preforms. Both optical preforms are mounted on a glass-working lathe in a longitudinal alignment and rotated. Then, a burner uniformly heats each preform end in an axial reciprocal movement. The heated preform ends are then brought together and welded.

U.S. Pat. No. 6,098,429, which is hereby incorporated by reference in its entirety, describes an optical fiber-drawing method in which the optical fiber preforms are drawn continuously. Preforms are welded end-to-end in the drawing tower by a servo-controlled laser in a way that reduces the area affected by the welding.

Such welds of optical fiber preforms are carried out on silica bars having substantially the same properties in terms of viscosity and thermal expansion. The optical preforms are intended for drawing the same kind of optical fiber and so have the same dopant concentrations. The weld between adjacent preforms is therefore generally clean and solid.

It is often necessary, however, to weld silica bars having very different properties (e.g., chemical compositions). For example, a primary preform, often containing dopants in various concentrations, may have to be secured to an undoped silica bar of a glass-working lathe support. Alternatively, two preforms with different dopant concentrations may have to be welded together (e.g., welding a highly doped preform with a slightly doped preform).

Welding silica bars of different compositions is rife with complications. The property differences of the materials to be welded can cause weld brittleness. Consequently, weld failure and breakage is unacceptably common. During overcladding operations, for example, weld failure can lead to the destruction of an expensive primary preform. Therefore, there is a need for an efficient method for welding a primary preform to a silica bar that has different properties in a way that reduces the risk of preform breakage during overcladding operations.

SUMMARY OF THE INVENTION

Accordingly, the present invention proposes a method for welding at least one end of a primary preform to an adjacent end of a silica bar possessing different properties (e.g., thermal and/or viscosity). The silica bar can be, for example, a second primary preform or, more typically, a supporting silica bar of a glass-working lathe support, which is used for overcladding the primary preform.

The welding of adjacent ends of the primary preform and the supporting silica bar can be achieved by projecting and fusing silica grain (e.g., natural silica) using a plasma torch. The projected silica grain effects the formation of respective doping gradients on the ends of the primary preform and the silica bar. As the silica grain deposited at each welding end is of the same composition, the adjacent ends of the primary preform and the silica bar may be brought into contact and fused to thereby form a weld.

The steps of (i) projecting and fusing the silica grain onto the respective ends of the primary preform and the silica bar and (ii) bringing into contact the respective ends of the primary preform and the silica bar may be performed sequentially or concurrently. The resulting weld requires only a small amount of silica grain to provide improved strength and reliability. Typically the weld includes between about 1-5 $cm^3$ of projected silica grain.

As noted, hand welding a high-purity primary preform to a relatively low-quality silica bar is especially subject to human error. This can lead to poor weld quality between the different glass materials. It is, therefore, advantageous to use the plasma torch available in the overcladding installation for welding the second end of the primary preform 100 to the second supporting silica bar 210.

The first end of the primary preform 100 is typically welded by hand in order to attach the primary preform 100 to the glass-working lathe support 205. It should be understood, however, that it would also be possible to use the overcladding installation to weld both ends of the primary preform 100 to first and second silica bars 215, 210, respectively, if the primary preform could be held in place during formation of the first weld (i.e., welding the primary preform 100 and the first silica bar 215).

The foregoing, as well as other objectives and advantages of the invention and the manner in which the same are accomplished, is further specified within the following detailed description and its accompanying drawings.

DETAILED DESCRIPTION

In one aspect, the present invention is a method for forming an improved weld between a primary preform and a silica bar to facilitate overcladding of the primary preform. In particular, the present method provides a superior weld where the primary preform and the silica bar possess different compositions and properties (e.g., doping concentrations).

In this regard, the present invention embraces the welding of a primary preform to a supporting silica bar of a glass-working lathe support. By way of example, the following disclosure describes an embodiment in which the primary preform is welded to a supporting silica bar of a glass-working lathe support. Those having ordinary skill in the art will appreciate, however, that the discussion of this exemplary embodiment can be readily applied to other embodiments in which the primary preform and the silica bar possess different properties (e.g., the welding of two primary preforms having different doping concentrations).

Figure 1:
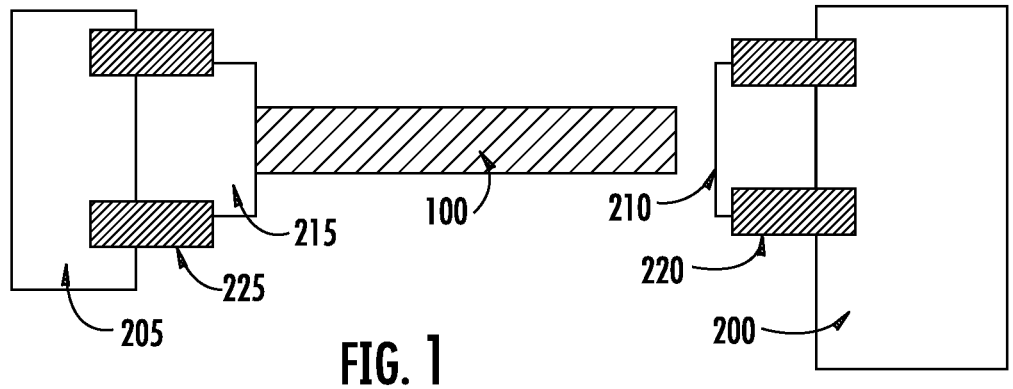
FIG. 1 schematically depicts a known installation for overcladding an optical fiber preform.
Figure 2:
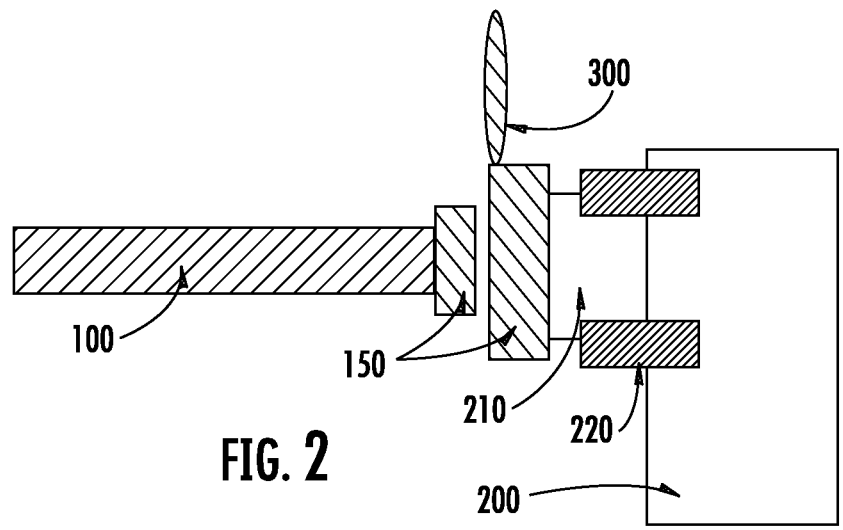
FIGS. 2 and 3 schematically depict the welding of a primary preform to a supporting silica bar of a glass-working lathe support.
Figure 3:
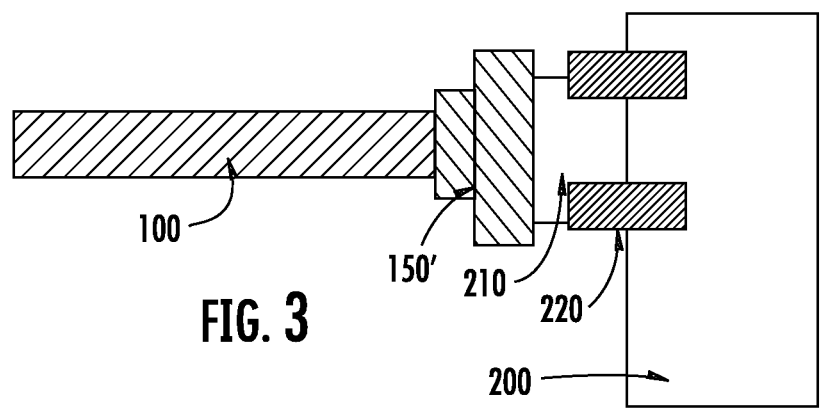

In accordance with the present invention, FIGS. 2 and 3 depict an installation for overcladding an optical fiber preform in order to form a final preform that may be used to draw optical fiber in a drawing tower. For instance, FIGS. 2 and 3 schematically depict a primary preform 100 and a supporting silica bar 210 that is affixed to a glass-working lathe support 200 by chucks 220.

Such primary preforms are typically formed of high-purity silica and can be manufactured according to any known technique (e.g., PCVD in a silica tube). As will be known to those having ordinary skill in the art, such primary preforms generally have at least one doped area and often several differently doped annular areas.

The supporting silica bar 210 of the glass-working lathe support 200 is adapted to secure an end of the primary preform 100 in order to drive the primary preform 100 into rotation around its longitudinal axis during the overcladding process. (For the sake of simplicity, FIGS. 2 and 3 omit the other end of the primary preform 100, which has already been welded to another supporting silica bar on the opposite side of the glass-working lathe.)

In contrast to the high-purity silica in the primary preform 100, the silica of the supporting silica bar 210 is typically not doped and is often contaminated. The compositional difference between the high-purity silica of the primary preform 100 and the silica of the supporting silica bar 210 complicates the welding of the primary preform 100 to the supporting silica bar 210. As previously explained, these different kinds of silica possess different thermal and viscosity characteristics.

The present invention proposes a way to form an improved weld between the primary preform 100 and the supporting silica bar 210 by projecting and fusing silica grain on adjacent ends of the primary preform 100 and the supporting silica bar 210. This is schematically depicted in FIG. 2.

Overcladding of the primary preform 100 may be carried out by plasma deposition of silica grain. This same overcladding installation may be conveniently employed for this projection of silica grain onto the adjacent ends of the primary preform 100 and the supporting silica bar 210. As will be understood by those having ordinary skill in the art, a conduit (not depicted) near the plasma torch 300 feeds the silica grain to facilitate both the welding and overcladding operations.

According to the present invention, before proceeding with the overcladding operation along the primary preform 100, silica grain is projected and fused by the plasma torch 300 onto adjacent ends of the primary preform 100 and the supporting silica bar 210. For reasons of cost, the projected silica grain is typically natural silica grain though slightly doped silica grain may also be used (e.g., if the primary preform is itself highly doped).

The projected silica grain fuses onto the respective softened ends of the heated primary preform 100 and the heated supporting silica bar 210. In doing so, the projected silica grain blends with the doped silica of the primary preform 100 and the silica of the supporting silica bar 210, which, as noted, is typically not doped. In this way, silica doping gradients 150 are thereby generated at the adjacent ends of the primary preform 100 and the supporting silica bar 210 (i.e., at the respective ends to be welded). The doping gradients 150 ensure that the ends of the primary preform 100 and the supporting silica bar 210, which are to be welded, have substantially the same thermal and viscosity properties.

As adjacent ends of the primary preform 100 and the supporting silica bar 210 are forced into contact, the silica doping gradients 150 fuse into a solid and reliable silica-grain weld 150'. As described herein, the doping gradients 150 are deemed to be substantially coextensive with the silica-grain weld 150' (i.e., there is no silica-grain weld 150' until the primary preform 100 and supporting silica bar 210 are fused.)

As discussed previously with respect to other methods, the diffusion of contaminants means that the welded end of the primary preform 100 is unsuitable for quality fiber drawing. The present method achieves a superior weld 150', but the grain-covered end of the primary preform 100 is likewise lost for optical fiber drawing. It should be noted, however, that the present invention does not introduce any more waste than conventional methods for making a weld between a primary preform and a silica bar. Thus, the method according to the present invention provides a stronger, more reliable weld 150' without generating additional waste.

The silica-grain weld 150' formed between the adjacent ends of the primary preform 100 and the supporting silica bar 210 can be formed in different ways.

In a two-step embodiment, respective doping gradients 150 are formed on the adjacent ends of the primary preform 100 and the supporting silica bar 210 and then the respective ends are brought into contact to induce the welding (i.e., the formation of silica-grain weld 150').

In a one-step embodiment, welding the primary preform 100 to the supporting silica bar 210 may be performed simultaneously with the generation of the doping gradients 150. For example, the adjacent ends of the primary preform 100 and the supporting silica bar 210 can be moved ever closer (e.g., by a robot or other automation) while the plasma torch 300 simultaneously fuses the projected silica grain onto the respective ends of the primary preform 100 and the supporting silica bar 210.

Only a small amount of silica grain must be projected to form the doping gradients 150 and thus the silica-grain weld 150'. In other words, a strong weld 150' can be formed according to the present invention at modest cost. The doping gradients 150 and the silica-grain weld 150' are depicted to be relatively large in FIGS. 2 and 3, respectively. This is merely for illustration, however, as the silica-grain weld 150' depicted in FIG. 3 typically has a volume of about 1-5 cm$^3$. Such a small amount of silica grain is sufficient to ensure proper adhesion of the primary preform 100 to the supporting silica bar 210. For example, for a primary preform 100 with a diameter of about 33 millimeters, only about 3 cm$^3$ is necessary to form silica-grain weld 150'. Those having ordinary skill in the art will appreciate that some supplemental welding may occur directly between the primary preform 100 and the supporting silica bar 210 (i.e., in addition to the silica-grain weld 150').

As noted, the foregoing discussion presumes that the other end of the primary preform 100 has already been welded to another supporting silica bar on the opposite side of the glass-working lathe. Those having ordinary skill in the art will appreciate that both ends of the primary preform can be fused to silica bars 210, 215 in accordance with the present invention as previously discussed. Doing so, of course, requires that the primary preform 100 be precisely positioned during formation of the first weld (i.e., welding the primary preform 100 and the first silica bar 215).

After the primary preform 100 has been secured to the glass-working lathe support 200 according to the method of the present invention, the primary preform 100 may be overcladded using known techniques, such as by projecting and fusing silica grain onto the surface of the primary preform 100 until the target diameter of the final preform is achieved. These unit operations will be known to those having ordinary skill in the art and not further discussed herein.

After the completion of the overcladding of the primary preform 100 and other process steps (e.g., forming a cone at the end of the final preform and polishing the outer surface with the plasma torch), the final preform is separated from the supporting silica bars 210, 215. For instance, the final preform is separated from the second supporting silica bar 210 of the glass-working lathe support 200 by heating the silica-grain weld 150' that was formed according to the present invention and pulling away the final preform from the glass-working lathe support 200 at the silica-grain weld 150'. This heating and pulling forms a cone at the end of the final preform. The cone is conveniently used as a starter for the drawing of the optical fiber on a drawing tower.

As noted, the method of the present invention employs available overcladding equipment. The plasma torch 300 and the silica grain-feeding conduit are readily available as each is required for overcladding the primary preform 100. Additionally, welding the primary preform 100 to the supporting silica bar 210 of the glass-working lathe support 200 may be integrally controlled by a robot dedicated to overcladding operations by modifying the robotic control program. Therefore, the welding operation according to the present invention does not require much labor and productivity is improved.

More importantly, however, the method according to the present invention significantly diminishes the risk of breakage to the primary preform 100 because of bad welding (i.e., between the primary preform 100 and the supporting silica bar 210, 215).

In the specification and figures, typical embodiments of the invention have been disclosed. The present invention is not limited to such exemplary embodiments, and is useful to the welding of silica bars having different compositions (e.g., possessing different doping concentrations that cause notable viscosity differences). Unless otherwise noted, specific terms have been used in a generic and descriptive sense and not for purposes of limitation.

The invention claimed is:

1. A method for forming a weld between a primary preform and a silica bar, the method comprising:
    projecting and fusing silica grain under a plasma torch onto an end of a primary preform and onto an end of a silica bar, wherein the primary preform and the silica bar possess different chemical compositions;
    moving the end of the primary preform toward the end of the silica bar while, at the same time, projecting and fusing silica grain under a plasma torch onto the end of the primary preform and the end of the silica bar; and
    thereafter bringing into contact the end of the primary preform and the end of the silica bar to form a weld between the end of the primary preform and the end of the silica bar.

2. The method according to claim 1, wherein the silica bar is a supporting silica bar of a glass-working lathe support used for overcladding the primary preform.

3. The method according to claim 1, wherein the silica bar is another primary preform.

4. The method according to claim 1, wherein the step of projecting and fusing silica grain onto an end of a primary preform and onto an end of a silica bar comprises projecting and fusing natural silica under a plasma torch onto an end of the primary preform and onto an end of the silica bar.

5. The method according to claim 1, wherein the weld between the end of the primary preform and the end of the silica bar comprises a silica-grain weld of about 1-5 cm$^3$.

6. A method for forming a weld between a primary preform and a silica bar, the method comprising:
    projecting and fusing silica grain under a plasma torch onto an end of a primary preform and onto an end of a silica bar, wherein the primary preform and the silica bar possess different chemical compositions; and
    during the step of projecting and fusing silica grain, bringing into contact the end of the primary preform and the end of the silica bar to form a weld between the end of the primary preform and the end of the silica bar.

7. The method according to claim 6, wherein the silica bar is a supporting silica bar of a glass-working lathe support used for overcladding the primary preform.

8. The method according to claim 6, wherein the silica bar is another primary preform.

9. The method according to claim 6, wherein the step of projecting and fusing silica grain onto an end of a primary preform and onto an end of a silica bar comprises projecting and fusing natural silica under a plasma torch onto an end of the primary preform and onto an end of the silica bar.

10. The method according to claim 6, wherein the weld between the end of the primary preform and the end of the silica bar comprises a silica-grain weld of about 1-5 cm$^3$.

* * * * *